(12) United States Patent
Ishmael et al.

(10) Patent No.: US 12,313,346 B1
(45) Date of Patent: May 27, 2025

(54) DIRECT-CONTACT HEAT EXCHANGE THERMAL ENERGY STORAGE SYSTEM

(71) Applicant: Active Energy Systems, Knoxville, TN (US)

(72) Inventors: Mitchell Ishmael, Oak Ridge, TN (US); Levon Atoyan, Knoxville, TN (US); Ronald Kwok, Oak Ridge, TN (US); Sonya Sokhey, Knoxville, TN (US); Jesse Buckley, Knoxville, TN (US); John Cadotte, Knoxville, TN (US); Lucas Mihlbachler, Knoxville, TN (US)

(73) Assignee: ACTIVE ENERGY SYSTEMS, Knoxville, TN (US)

( * ) Notice: Subject to any disclaimer, the term of this patent is extended or adjusted under 35 U.S.C. 154(b) by 0 days.

(21) Appl. No.: 18/665,294

(22) Filed: May 15, 2024

Related U.S. Application Data

(60) Provisional application No. 63/552,499, filed on Feb. 12, 2024.

(51) Int. Cl.
*F28D 20/02* (2006.01)
*F28D 20/00* (2006.01)

(52) U.S. Cl.
CPC ....... *F28D 20/0034* (2013.01); *F28D 20/025* (2013.01); *F28D 2020/0004* (2013.01); *F28D 2020/0069* (2013.01); *Y02E 60/14* (2013.01)

(58) Field of Classification Search
CPC ....... Y02E 60/14; F24F 5/0017; F28D 20/025
See application file for complete search history.

(56) References Cited

U.S. PATENT DOCUMENTS

| | | |
|---|---|---|
| 2,996,894 A | 8/1961 | Shade |
| 3,227,649 A * | 1/1966 | Ghormley ............ B01D 9/0009 165/DIG. 162 |
| 3,672,182 A | 6/1972 | Stowasser et al. |

(Continued)

FOREIGN PATENT DOCUMENTS

| | | | | |
|---|---|---|---|---|
| EP | 3315586 A1 * | 5/2018 | ............. | C09K 5/042 |
| JP | H0719536 A * | 1/1995 | | |

(Continued)

OTHER PUBLICATIONS

Inaba, Hideo et al. "Liquid-Liquid Direct Contact Heat Exchange Using a Perfluorocarbon Liquid for Waste Heat Recovery" (Heat Transfer Characteristics Obtained with Perfluorocarbon Droplets Descending in a Hot Water Medium) Series B, vol. 43, No. 1, 2000 JSME International Journal pp. 52-61 (10 pages).

(Continued)

*Primary Examiner* — Eric S Ruppert
(74) *Attorney, Agent, or Firm* — Osha Bergman Watanabe & Burton LLP

(57) ABSTRACT

A thermal energy storage system having a thermal storage tank configured to hold a thermal storage media and a working fluid, an inlet in fluid communication with a liquid distributor disposed at the bottom of the thermal storage tank configured to introduce the working fluid into the thermal storage tank, a skimmer configured to direct the working fluid accumulated at the top of the thermal storage tank toward an outlet, a charging/discharging section fluidly connected to the thermal storage tank via the inlet and the outlet.

19 Claims, 2 Drawing Sheets

(56) References Cited

U.S. PATENT DOCUMENTS

| | | | |
|---|---|---|---|
| 3,869,870 | A | 3/1975 | Kuehner |
| 4,596,120 | A | 6/1986 | Knodel et al. |
| 5,481,882 | A | 1/1996 | Watanabe et al. |
| 10,415,864 | B2 | 9/2019 | Choi |
| 11,643,964 | B2 | 5/2023 | Spadacini |
| 2005/0172659 | A1 | 8/2005 | Barker et al. |
| 2011/0003721 | A1* | 1/2011 | Hong .............. C10M 169/04 977/750 |

FOREIGN PATENT DOCUMENTS

| | | | |
|---|---|---|---|
| JP | 2521296 | B2 * | 8/1996 |
| WO | 2013102537 | A1 | 7/2013 |
| WO | 2022207047 | A1 | 10/2022 |

OTHER PUBLICATIONS

Lemenand, Thierry et al. "Turbulent direct-contact heat transfer between two immiscible fluids" International Journal of Thermal Sciences 49 (2010) 1886-1898 (13 pages).

Letan, R. et al. "The Mechanism of Heat Transfer in a Spray Column Heat Exchanger" AIChE Journal May 1968 vol. 14, No. 3 pp. 398-405 (8 pages).

Letan, R. et al. "The Mechanism of Heat Transfer in a Spray Column Heat Exchanger" II. Dense Packing of Drops AIChE Journal Nov. 1970 vol. 16, No. 6 pp. 955-963 (9 pages).

Ma, Z. W. et al. "Review of Recent Patents on Ice Slurry Generation" Recent Patents on Engineering 2011, vol. 5, No. 2, 103-112 (10 pages).

Somer, T. G. et al. "Heat Transfer to an Immiscible Liquid Mixture and Between Liquids in Direct Contact" Desalination. 13 (1973) 231-249 (19 pages).

Wahed, M. A. et al. "An Analysis of a Direct Contact Ice Slurry Generator" Proceedings of 2008 ASME Summer Heat Transfer Conference HT2008 Aug. 10-14, 2008, Jacksonville, Florida, USA (9 pages).

Zhang, Y. et al. "Experimental Thermal Study of Ice Slurry Production System Equipped With Direct Contact Heat Exchanger and Spiral Nozzle" Journal of Thermal Science and Engineering Applications Aug. 2021, vol. 13 / 041022-1 (9 pages).

Sideman, "Direct Contact Heat Transfer Between Immiscible Liquids", Dept. of Chem. Engineering Technion, Israel Insitute of Technology, Haifa, Israel, pp. 207-286, 1966 (80 pages).

Wallis, "The Terminal Speed of Single Drops or Bubbles in an Infinite Medium", Int. J. Multiphase Flow, vol. 1, pp. 491-511, Pergamon Press, 1974 (21 pages).

* cited by examiner

DIRECT-CONTACT HEAT EXCHANGE THERMAL ENERGY STORAGE SYSTEM

STATEMENT REGARDING FEDERALLY SPONSORED RESEARCH

This invention was made with government support under award number DE-SC0020715 awarded by the Department of Energy. The government has certain rights in the invention.

BACKGROUND

Effective thermal energy storage technologies for building heating, ventilation, and air conditioning (HVAC) loads will play a role in the transition from current energy technologies to intermittent renewable sources of electricity and power. Thermal energy storage systems may be used for heating or for cooling. Thermal energy storage systems that can be used for both heating and for cooling may provide cost savings and decarbonize HVAC operations. Thermal energy storage systems which use direct-contact heat exchange may be a convenient technology for dual high-temperature, low-temperature thermal energy storage.

Thermal energy storage systems have been described in the art. U.S. Pat. No. 2,996,894 (Shade) describes a "closed cycle latent heat recovery system" utilizing an aqueous solution of disodium phosphate as a liquid medium to store/release latent heat and circulating a liquid between the liquid medium and a heat exchanger. The reference discusses the liquid medium and the circulating liquid being in the direct contact and maintained as separate layers and appears to use the precipitation/phase-change of the disodium phosphate as the mechanism of heat storage. This approach is limited in its usefulness in a number of respects including its limited storage efficiency and stability over time.

U.S. Pat. No. 5,481,882 (Watanabe et al.) describes a "latent heat accumulation system" and further discusses a number of alternate configurations for such systems. These include additional systems that, like Shade, include cycling a direct-contact oily liquid between a heat-storage medium and a heat exchanger. These additional systems further include discussion of water as the heat storage medium. These systems all have disadvantages including emulsification of the oily liquid in the water, separation/collection of the oily liquid after heat-transfer, ice clogging within the oily liquid flow path, poor or limited efficacy, etc., and there has been a general lack of commercialization of such systems. As such there remains a need for a high-efficiency thermal energy storage system.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one or more aspects, embodiments disclosed herein relate to a thermal energy storage system. The system includes a thermal storage tank configured to hold a thermal storage media and a working fluid, an inlet in fluid communication with a liquid distributor disposed at the bottom of the thermal storage tank configured to introduce the working fluid into the thermal storage tank, a skimmer configured to direct the working fluid accumulated at the top of the thermal storage tank toward an outlet, a charging/discharging section fluidly connected to the thermal storage tank via the inlet and the outlet. The working fluid has a density less than that of the thermal storage media across the range of temperatures from 0° C. to 40° C. at 1 atm, the working fluid and the thermal storage media are immiscible across the range of temperatures from 0° C. to 40° C. at 1 atm, and the working fluid is in a liquid phase across the range of temperatures from 0° C. to 40° C. at 1 atm.

In another aspect, embodiments disclosed herein relate to a thermal energy storage system. The system includes a thermal storage tank configured to hold a thermal storage media and a working fluid, an inlet in fluid communication with a liquid distributor disposed at a bottom of the thermal storage tank configured to introduce the working fluid into the thermal storage tank, a skimmer configured to direct the working fluid accumulated at a top of the thermal storage tank toward an outlet, and a charging/discharging section fluidly connected to the thermal storage tank via the inlet and the outlet. The thermal storage media comprises water, and the working fluid comprises an isoparaffin, and wherein the isoparaffin is selected from the group consisting of polyalphaolefins, gas-to-liquid fluids, or combinations thereof.

In another aspect, embodiments disclosed herein relate to a thermal energy storage system. The system includes a thermal storage tank configured to hold a thermal storage media and a working fluid, an inlet in fluid communication with a liquid distributor disposed at a bottom of the thermal storage tank configured to introduce the working fluid into the thermal storage tank, wherein the liquid distributor comprises a plurality of nozzles with an average spatial density equal to or greater than 0.15 nozzles per 1000 $cm^2$, a skimmer configured to direct the working fluid accumulated at a top of the thermal storage tank toward an outlet, and a charging/discharging section fluidly connected to the thermal storage tank via the inlet and the outlet. The working fluid is immiscible across a range of temperatures from 0° C. to 40° C. at 1 atm, and wherein a volume of the working fluid is equal to or greater than 4% of a volume of the thermal storage media.

Other aspects and advantages of the claimed subject matter will be apparent from the following description and the appended claims.

Figure 1:
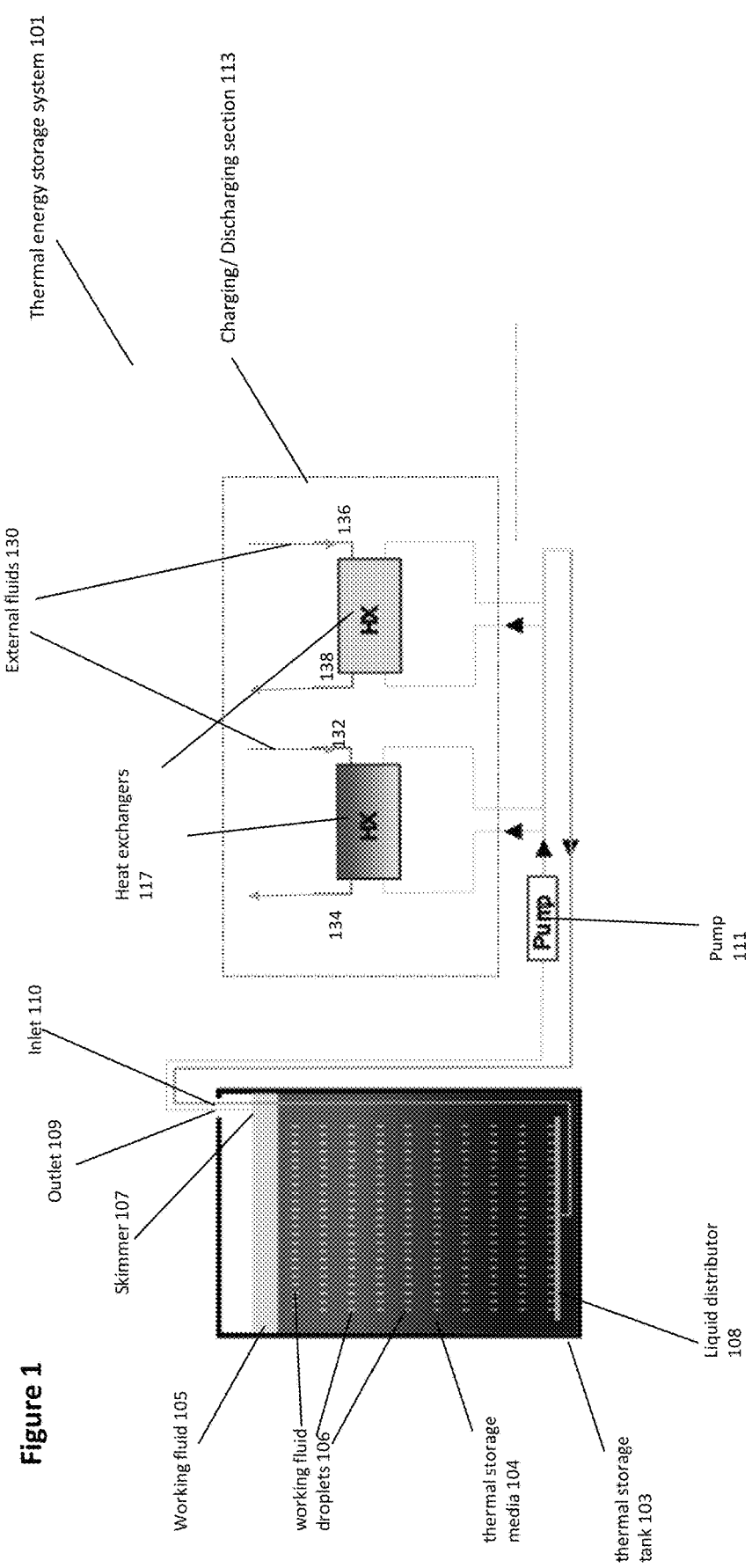
FIG. 1 illustrates a thermal energy storage system according to embodiments of the present disclosure.

Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Disclosed herein is a thermal energy storage system and method that is low cost and may increase the energy efficiency and energy density of large-scale thermal energy storage. Instead of exchanging heat through a solid cooling surface, like for example the cooling surface on a conventional indirect-contact heat exchanger, such as a brazed plate or shell and tube heat exchanger, in accordance with one or more embodiments, a working fluid directly contacts the thermal storage media and exchanges thermal energy. Elimination of the conventional indirect heat exchanger advantageously lowers capital cost and decreases the thermal driving force required for the same thermal energy transfer, improving energy efficiency.

The thermal energy storage system disclosed herein may be used for low-temperature or high-temperature thermal energy storage or both. In applications where the system may be used for both low-temperature thermal storage and high-temperature thermal energy storage, consideration of the working fluid properties at both sets of conditions may lead to the selection of a working fluid that may not have been selected had the process been designed for solely low-temperature or high-temperature usage.

Accordingly, the thermal energy storage systems of the present disclosures can be used for heating applications, cooling applications, or both. A thermal energy storage system designed to be used for heating or cooling, or both, depending on the season, is desirable for several reasons, including but not limited to space savings, material savings, cost savings, and decarbonization of HVAC operations during different seasons of the year. Additionally, direct contact of fluids which transfer heat between them may be beneficial. By exchanging thermal energy between two materials without a mechanical barrier separating them, direct contact heat exchangers may be thermodynamically efficient and cost-effective. Direct contact heat exchangers have previously been used for ice slurry production and for high-temperature thermal energy storage. Some direct contact heat exchangers use spray column configurations. However, integration of the direct contact heat exchange system within the thermal energy storage tank is a relatively unexplored topic.

Thermal energy storage systems according to embodiments disclosed herein may include at least a thermal storage media. Water is commonly used as the thermal storage media because of its low-cost, high-energy density, and high heat capacity. Additionally, water may be used as the thermal storage media in a thermal energy storage system for heating applications and for cooling applications. However, it is also envisioned that other thermal storage media may be used.

Thermal energy storage systems also according to embodiments disclosed herein may include at least a working fluid. As mentioned above, the working fluid directly contacts the thermal storage media and exchanges thermal energy.

In one or more embodiments the working fluid may include a hydrocarbon. The working fluid may include a quantity of hydrocarbon that is greater than 50% (v/v), such as greater than 75%, 80%, 85%, 90%, 95%, or 98%. In one or more embodiments, the flash point of the working fluid, the lowest liquid temperature at which, under standardized conditions, a liquid gives off vapor in a quantity capable of forming an ignitable vapor/air mixture, may be greater than 75° C., 80° C., 85° C., or 90° C. In one or more embodiments, the vapor pressure of the working fluid may be less than 1 kPa, 0.1 kPa, 0.05 kPa, 0.01 kPa, or 0.005 kPa measured at 40° C. In one or more embodiments, the dynamic viscosity of the working fluid may be between 0.9-500 cSt, 1-150 cSt, 2-150 cSt, 3-150 cSt, 1-100 cSt, 2-100 cSt, 3-100 cSt, 1-50 cSt, 2-50 cSt, or 3-50 cSt measured at 0° C. and 1 atmosphere.

In one or more embodiments, the hydrocarbon is a poly-alpha-olefin (PAO). Here PAO refers to a class of materials that are synthetically derived from ethylene with isoparaffinic structures. They may be the hydrogenated products of reactions between alpha olefins, including but not limited to 1-decene, 1-dodecene, and 1-octene. In one or more embodiments, the hydrocarbon is a gas-to-liquid (GTL) fluid derived from a Fischer-Tropsch process. In one or more embodiments, the hydrocarbon has carbon numbers from C8-C36, containing both branched and linear structures. In one or more embodiments, the hydrocarbon is hydrogenated. In one or more embodiments, the hydrocarbon is at least partially hydrogenated. In one or more embodiments, the hydrocarbon is completely hydrogenated.

In one or more embodiments, the working fluid may include one or more isoparaffins that may be paraffins with branched chains. Paraffins generally consist of straight-chained (also known as "normal") alkanes and are generally solid at room temperature. Isoparaffins, like paraffins, are also generally alkanes but due to their branched-chain nature are generally liquids at room temperature. Most of the paraffinic compounds in naturally occurring crude oils, for example, are normal paraffins, while isoparaffins are frequently produced in refinery processes or may be synthetically derived. Synthetic isoparaffins include poly-alpha olefins (PAOs) and "gas-to-liquid" (GTL) fluids. Such isoparaffins can include hydrocarbons having carbon numbers from C8-C36 or C8-C30. The working fluid may also include a biocide in order to limit the growth of organic matter within the fluids present within the system.

As mentioned above, in accordance with the present disclosure, a working fluid directly contacts a thermal storage media and exchanges thermal energy. Such thermal energy exchange occurs in a thermal energy storage system. FIG. 1 shows a thermal energy storage system 101 according to embodiments of the present disclosure. Thermal energy storage system 101 includes a thermal storage tank 103, a charging/discharging section 113, a skimmer 107, and a liquid distributor 108. Thermal storage tank 103 includes an inlet 110 and an outlet 109. Thermal storage tank 103 is configured to hold a thermal storage media 104. Liquid distributor 108 is disposed proximate the bottom of thermal storage tank 103 and is configured to introduce the working fluid 105 into thermal storage tank 103. Skimmer 107 is configured to remove a fluid from the top of thermal storage tank 103. Charging/discharging section 113 is fluidly connected to thermal storage tank 103 via outlet 109 of thermal storage tank 103. The following paragraphs will explain the function of each component and section in detail.

Liquid distributor 108 is configured to introduce working fluid 105 into thermal storage tank 103. Thermal storage tank 103 contains a thermal storage media 104. In some embodiments of the present disclosure, working fluid 105 has a lower density than thermal storage media 104, and working fluid 105 and thermal storage media 104 are immiscible. In some embodiments of the present disclosure, immiscible components refer to components that return to visibly separate phases of matter after having been mixed. In embodiments where working fluid 105 and thermal storage media 104 are immiscible, and working fluid 105 has a lower density than thermal storage media 104, a plurality of working fluid droplets 106 exiting liquid distributor 108 proximate the bottom of thermal storage tank 103 will buoyantly rise through thermal storage media 104 until plurality of working fluid droplets 106 reach the top of thermal storage tank 103. Plurality of working fluid droplets 106 may accumulate on top of thermal storage media 104.

The thermal storage tank 103 has a top and a bottom and one or more sidewall connecting the top and bottom. The thermal storage tank 103 may have any dimensions, volume or shape and may be generally cylindrical and have a circular cross section. The thermal storage tank may have an exterior volume from about 0.5 to 10,000 m³. The thermal. storage tank may have a total interior volume of about 0.5 to 10,000 m³. The thermal storage tank 103 may have a footprint area (i.e., the area of the base or bottom of the storage tank) from about 0.5 to 1,000 m². In one or more embodiments, the thermal storage tank 103 may be several smaller tanks. In some embodiments, the height of the thermal storage tank may be approximately 2 m.

The thermal storage tank 103 may be insulated to prevent unwanted thermal transfer to the ambient environment. The insulation may be provided by a material used in forming the thermal storage tank 103 (i.e., vacuum-jacketing) or may be included proximate the top, bottom, or sidewall(s) of the thermal storage tank 103. For example, the top, bottom, or sidewall(s) of the thermal storage tank 103 may have an R-value greater than 0.5, or greater than 1.0 or greater than 2.0 or greater than 3.0, In some embodiments, the working fluid 105 may have a higher density than the thermal storage media 104, in which case the plurality of working fluid droplets 106 fall through the storage media due to the higher buoyancy of the thermal storage media 104 versus the working fluid 105. In such an embodiment, the liquid distributor 108 may be disposed proximate the top of thermal storage tank 103 and the skimmer 107 may be proximate the bottom of the thermal storage tank 103 (not illustrated). In embodiments where the plurality of working fluid droplets 106 rise or fall through thermal storage media 104, there is direct heat transfer between the plurality of working fluid droplets 106 and thermal storage media 104.

Selection of working fluid 105 to optimize heat transfer between the plurality of working fluid droplets 106 and thermal storage media 104 may have a consideration of the properties of working fluid 105 under cooling applications and under heating applications. Therefore, an understanding of how working fluid 105 behaves at high temperatures and at low temperatures is of paramount importance. Some advantages that working fluid 105 may exhibit at high temperatures may be nullified by disadvantages that working fluid 105 may exhibit at low temperatures, and vice-versa.

In direct-contact heat exchange thermal energy storage systems, particularly those intended for ice slurry generation, fluorocarbon liquids may be used. Such fluorocarbons have a higher density than water, and favorable thermal conductivities and viscosities for thermal energy storage applications. However, fluorocarbon liquids have low heat capacity, high vapor pressures, and low boiling points, which negatively affect the objective of thermal energy storage technologies, especially those configured to work with high-temperature thermal energy storage. Other common working fluids include light hydrocarbon liquids. Some light hydrocarbon liquids, such as toluene, have been used as they have low viscosity and high density, which are positive factors. However, in the case of toluene, there are health and flammability concerns, in addition to high vapor pressures and low boiling points. In general, in order to achieve acceptable properties such as vapor pressures, boiling points, and flash points, the size of the molecule or molecules of the working fluid increases. However, as the size of the molecule or molecules of the working fluid increases, the viscosity of the working fluid may increase as well. If a working fluid has a high viscosity, the heat transfer between the working fluid and another contacted fluid will decrease compared to a thinner working fluid. Therefore, for direct contact heat exchange and thermal storage, it has been found that select working fluids with specified composition(s) and ranges of properties allow for efficient design of a thermal energy storage system.

In one or more embodiments disclosed herein, working fluid 105 may include an isoparaffin. Isoparaffins may be produced in refinery processes or may be synthetically derived. Synthetic isoparaffins may be poly-alpha olefins (PAOs) and gas-to-liquid (GTL) fluids. In some embodiments, working fluid 105 may be more than 50 percent isoparaffin. In other embodiments, working fluid 105 may be more than 75 percent isoparaffin. Additionally, in some embodiments, fluid 105 may be an isoparaffin with a molecular weight of 150-500 Daltons, with less than 1 percent of aromatic hydrocarbons, and/or less than 1 percent of olefinic hydrocarbons. Aromatic hydrocarbons mix with water, and olefin hydrocarbons are highly reactive and may affect storage stability.

In some embodiments, working fluid 105 has a lower density than thermal storage media 104, with values ranging from 730-860 kg/m³ measured at a temperature 0° C. and at a pressure of 1 atm. Working fluid 105 may have a water solubility of less than 120 ppm, 100 ppm, or 80 ppm measured at a temperature 25° C. and at a pressure of 1 atm.

Storage stability in thermal energy storage applications is a parameter to be considered if thermal energy storage systems 101 are used for both cooling and heating applications. As the temperatures oscillate between high values and low values for charging and discharging, both working fluid 105 and thermal storage media 104 may undergo changes that may negatively affect components of thermal energy storage system 101.

In some embodiments, thermal storage media 104 may be water. In other embodiments, thermal storage media 104 may be a water-based fluid with higher concentration of water than other fluids or components. In some embodiments, thermal storage media 104 may include additives to modify the freezing point.

Still referring to FIG. 1, in some embodiments, thermal storage media 104 has a higher temperature than plurality of working fluid droplets 106 when working fluid 105 is first introduced to thermal storage tank 103. In these embodiments, direct heat transfer occurs in the direction from thermal storage media 104 to plurality of working fluid droplets 106. The temperature of plurality of working fluid droplets 106 increases as plurality of working fluid droplets 106 rise through thermal storage media 104, and the temperature of thermal storage media 104 may decrease.

In some embodiments, thermal storage media 104 has a lower temperature than plurality of working fluid droplets 106 when working fluid 105 is first introduced to thermal storage tank 103. In these embodiments, direct heat transfer occurs in the direction from plurality of working fluid droplets 106 to thermal storage media 104. The temperature of plurality of working fluid droplets 106 decreases as plurality of working fluid droplets 106 rise through thermal storage media 104, and the temperature of thermal storage media 104 may increase.

For discharging of the system, a skimmer 107 is used to direct working fluid 105, which has accumulated at the top of thermal storage tank 103, toward outlet 109 and toward charging/discharging section 113. Skimmer 107 may be used to separate working fluid 105 from thermal storage media 104. Skimmer 107 may include a filtration device which prevents the transfer of thermal storage media 104 to outlet 109 of thermal storage tank 103 during removal of working fluid 105 to transfer to charging/discharging section 113.

In some embodiments of the present disclosure, working fluid 105 exits thermal storage tank 103 and is directed to charging/discharging section 113. The working fluid 105 enters a heat exchanger 117 that is used to transfer thermal energy to the working fluid 105, from the working fluid 105, or both. While it would be appreciated that any heat exchanger of any configurations may be useful in embodiments herein, the heat exchanger 117 depicted is configured to allow indirect heat transfer between the working fluid 105 and one or more external fluid 130. During charging, when the system is storing thermal storage media at relatively low temperatures, thermal energy is removed from the working fluid 105 by the charging/discharging section 113. During discharging, when the system is storing thermal storage media at relatively low temperatures, thermal energy is transferred to the working fluid 105 by the charging/discharging section 113. During charging, when the system is storing thermal storage media at relatively high temperatures, thermal energy is transferred to the working fluid 105 by the charging/discharging section 113. During discharging, when the system is storing thermal storage media at relatively high temperatures, thermal energy is removed from the working fluid 105 by the charging/discharging section 113.

In some embodiments of the present disclosure, low temperature refers to temperatures below conventional office building thermostat set points. In some embodiments, high temperature refers to temperatures above conventional office building thermostat set points. In other embodiments of the present disclosure, low temperature refers to temperatures between −50° C. and 24° C. In some embodiments, high temperature refers to temperatures between 26° C. and 95° C.

In other embodiments, thermal storage media 104 exiting thermal storage tank 103 and directed to charging/discharging section 113 enters more than one discharging heat exchanger 117 in charging/discharging section 113. The charging/discharging section 113 may include more than one heat exchanger 117, as depicted in FIG. 1. The more than one heat exchangers 117 may be configured to work in parallel. The more than one heat exchangers 117 may also be configured to work in series. A pump 111 may be included to circulate working fluid 105 throughout the system. Valving or other types of control devices may be used to determine which fluids interact. The more than one heat exchangers 117 may allow heat transfer between working fluid 105 and more than one external fluids 130. The heat transfer may be in the direction from working fluid 105 to the more than one external fluids 130, which may result in a decrease of the temperature of working fluid 105 across the more than one heat exchangers 117. Alternatively, the heat transfer may be in the direction from the more than one external fluids 130 to working fluid 105, which may result in an increase of the temperature of working fluid 105 across the more than one heat exchangers 117.

In other embodiments (not depicted), thermal storage media 104 may be circulated through the charging/discharging section 113. In such an embodiment the thermal energy storage system 101 would be configured to provide fluid connectivity between thermal storage media 104 in the thermal storage tank 103 and the charging/discharging section 113. The thermal storage media exiting thermal storage tank may be directed to the same heat exchanger 117 or a different heat exchanger 117 than working fluid in charging/discharging section 113. The more than one heat exchangers 117 may allow heat transfer between the thermal storage media 104 and one or more external fluids 130. The heat transfer may be in the direction from thermal storage media 104 to the one or more external fluids 130, which may result in a decrease of the temperature of the thermal storage media 104 across the one or more heat exchanger 117. Alternatively, the heat transfer may be in the direction from the one or more external fluids 130 to the thermal storage media 104, which may result in an increase of the temperature of thermal storage media 104 across the one or more heat exchangers 117.

In some embodiments, working fluid 105 exiting charging/discharging section 113 is directed back to thermal storage tank 103. Working fluid 105 is introduced to thermal storage tank 103 using the liquid distributor 108. The working fluid 105 then returns to the thermal storage tank 103 to exchange heat with the thermal storage media 104.

Liquid distributor 108 located proximate the bottom of thermal storage tank 103 introduces the working fluid 105 into tank 103. Working fluid 105 forms a plurality of working fluid droplets 106 in thermal storage tank 103. Liquid distributor 108 may include holes, openings, or nozzles to emit working fluid 105 into thermal storage tank 103. In one or more embodiments, the average spatial density of distinct openings across the cross-section of the bottom of the thermal storage tank 103 may be 0.15 openings/1000 $cm^2$, 0.2 openings/1000 $cm^2$, 0.25 openings/1000 $cm^2$, 0.3 openings/1000 $cm^2$, 0.35 openings/1000 $cm^2$, or 0.4 openings/1000 $cm^2$. The holes, opening, or nozzles may have a cross-section of any shape such as circular, square, rectangular, triangular, star-shaped, and the like. The holes, opening, or nozzles may have a circular cross-section with a diameter; the diameter may be between 1-35 mm, 5-30 mm, or 10-26 mm. The holes, opening or nozzles may have a three-dimensional shape or may be simple openings in the liquid distributor 108. The holes, opening, or nozzles may be cylindrical, conical, frustoconical, or similar shape.

Liquid distributor 108 may have smooth, hydrophobic surfaces to prevent ice growth on liquid distributor 108 during applications when the temperature and the pressure inside thermal storage tank 103 are conducive to phase change of thermal storage media 104 from liquid to solid. In some embodiments, liquid distributor 108 may include a fluoropolymer, which has high hydrophobicity. In one or more embodiments, that fluoropolymer may be polyhexafluoropropylene, polytetrafluoroethylene (PTFE), fluorinated ethylene propylene (FEP), perfluroalkoxyalkane (PFA), polychlorotrifluoroethylene (PCTFE), polytrifluoroethylene, or combinations thereof.

Such a liquid distributor 108 may allow for efficient exchange of heat between the thermal storage media 104 and the working fluid 105. Efficient exchange of heat may also promote even cooling and freezing of the thermal storage media 104 throughout the cross-section of the thermal storage tank 103.

For embodiments representing charging of thermal storage media 104, a skimmer 107 is used to direct working fluid 105, which has accumulated at the top of thermal storage tank 103, toward outlet 109 and toward charging/discharging section 113. Skimmer 107 may be used to separate working fluid 105 from thermal storage media 104. Skimmer 107 may include a filter, screen, mesh, or similar which prevents the transfer of thermal storage media 104 to outlet 109 of thermal storage tank 103 during removal of working fluid 105. The maximum mesh size of the filter, screen, or mesh may be 1×1, 2×2, or 4×4. The minimum mesh size of the filter, screen, or mesh may be 60×60, 30×30, or 20×20. A protective perimeter, which here is defined as a standoff from the skimmer body, may be used around the skimmer body to help prevent infiltration of the thermal storage media, where the perimeter may extend more than 10 mm, 25 mm, or 50 mm from the skimmer body.

In some embodiments of the present disclosure, working fluid 105 may be present as a liquid phase in thermal storage tank 103. In some embodiments of the present disclosure, working fluid 105 may be present as a liquid phase throughout the thermal energy storage system 101. Working fluid 105 may be present as a liquid phase across the operating temperatures of the thermal energy storage system 101. Additionally, thermal storage media 104 may be present as a liquid phase, as a solid phase, or as a mixture of liquid and solid phases in thermal storage tank 103. In some embodiments of the present disclosure, regardless of the phases of working fluid 105 and thermal storage media 104, working fluid 105 will accumulate on top of thermal storage media 104.

In some embodiments the height of the working fluid 105 is at least 4%, 6%, 8%, 10%, 12%, 20%, 25%, 30%, 35%, 40%, 45%, 50%, or greater than 50% of a height of the thermal storage media 104, where the height of the working fluid 105 and the height of the thermal storage media 104 are measured in an axial direction in the thermal storage tank 103. In some embodiments the volume of the working fluid 105 present inside the thermal storage tank 103 is at least 4%, 6%, 8%, 10%, 20%, 25%, 30%, 35%, 40%, 45%, 50%, or greater than 50% of the thermal storage media 104 volume. Additional working fluid 105 inside the thermal storage tank 103 may help promote uninterrupted operation in the event of some of the working fluid 105 being trapped within solid formations of the thermal storage media 104.

In embodiments where there is a solid phase of thermal storage media 104 inside of thermal storage tank 103, mechanical agitation may be useful and included in thermal energy storage system 101 to facilitate the path of working fluid 105 to the top of thermal storage tank 103, and to ensure that the solid phase of thermal storage media 104 stays unconsolidated and flowable.

In other embodiments where there is a solid phase of thermal storage media 104 inside of thermal storage tank 103, a solid structure 140 may be disposed within the thermal storage tank 103 to promote nucleation and growth of the solid phase of thermal storage media 104, with the objective of localizing freezing of thermal storage media 104. Solid structure 140 can take any physical form within tank 103, but is a separate and distinct component from the thermal storage tank 103 and any other described component therein (such as skimmer 107) with the aforementioned function of promoting nucleation and growth of the solid phase of thermal storage media 104. In these example embodiments, the localization of the solid phase of thermal storage media 104 on a surface of solid structure 140 may decrease interference of the thermal storage media 104 with the flow of working fluid 105 as working fluid 105 flows to the top of thermal storage tank 103.

Figure 2:
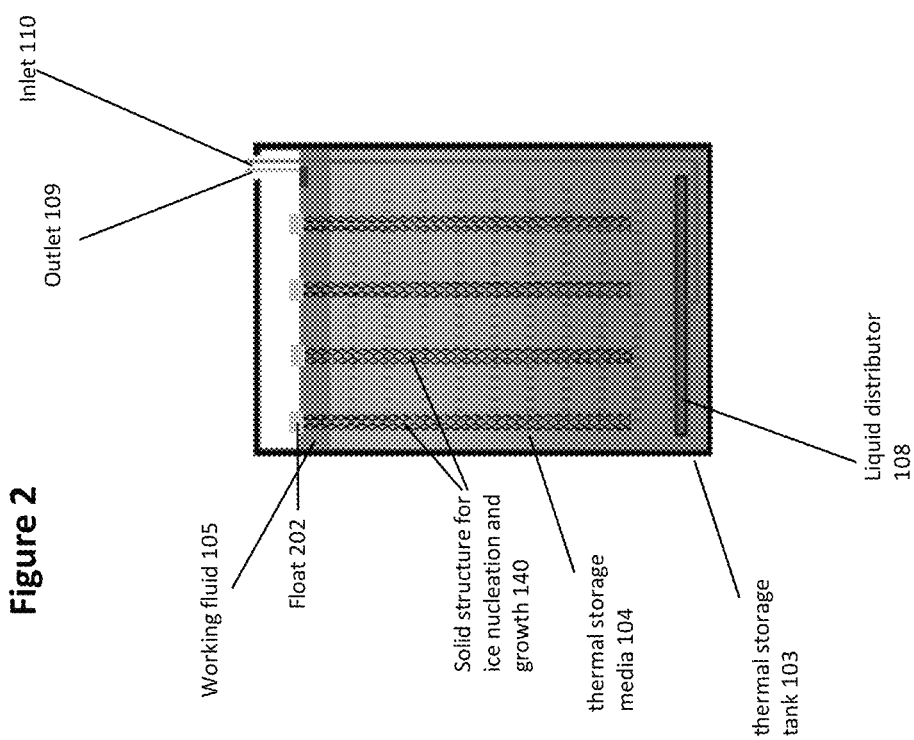
FIG. 2 illustrates a thermal energy storage system according to embodiments of the present disclosure.

For example, solid structure 140 may be a mesh, a net, a chain, a rod, a plate, a sheet, or a combination of some or all of these structures. Solid structure 140 may be made of plastic, metal, ceramic, or a combination of these materials. In some embodiments, such as illustrated in FIG. 2, solid structure 140 may be suspended by floats 202 that are more buoyant than the fluids inside of thermal storage tank 103. In other embodiments (not shown), solid structure 140 may be suspended from the top of thermal storage tank 103. In other embodiments, solid structure 140 may be attached to the bottom of thermal storage tank 103. In embodiments where solid structure 140 is attached to the bottom of thermal storage tank 103, solid structure 140 would be less likely to interfere with the collection of working fluid 105 by skimmer 107 and with the conveyance of working fluid 105 to outlet 109. Solid structures 140 may be located greater than 1 cm, 5 cm, 10 cm, 15 cm, 30 cm, 50 cm, or 100 cm away from the exit of the liquid distributor 108 or skimmer.

In some embodiments, solid structure 140 may be oriented vertically within the thermal storage tank 103, such that the solid structure 140 is aligned with the flow of working fluid 105 through thermal storage tank 103.

In some embodiments, solid structure 140 may include enhancements to the surface area, including but not limited to, the addition of protrusions such as fins, bumps, and ridges, the addition of depressions such as dimples and embossments, or combination thereof. The surface area of solid structure 140 may be enhanced with surface roughness. The surface area of solid structure 140 may be enhanced with surface porosity.

The solid structure 140, or structures, may have appreciable surface area when compared to the internal surface area of the tank, for example greater than 1%, 2%, 3%, 5%, 7.5%, or 10% of the internal surface area of the thermal storage tank. In some embodiments, the solid structure may be included in the wall of the tank.

Working Fluid

There are a number of requirements for the working fluid for a direct-contact heat exchange system. There should be minimal solubility between the working fluid and the thermal storage media, emulsification of either material in the other should be avoided, the materials must be chemically stable in the presence of each other, and the viscosities of the fluids should be low, over the entire operating range, to help promote heat transfer.

A brief overview of direct-contact heat transfer between a working fluid and water is provided here. Note that this overview is generally directed at thermal energy storage systems that use water as the thermal storage media and that are configured to be used in cooling-only applications, and as such may also be referred to as "ice-slurry heat transfer" or similar terms.

There are three broad categories of working fluids (also called "coolants") for direct-contact ice-slurry heat transfer technical approaches: (1) evaporating refrigerant, (2) single-phase gas, and (3) single-phase liquid. Slurry generation by directly using an evaporating refrigerant eliminates the need for a standard closed heat exchanger, reducing system cost and allowing for higher efficiencies through tighter approach temperatures. But the challenges caused by the mutual solubility of the refrigerant in the water and vice versa has made implementation of these systems challenging. Using a single-phase gas for slurry generation can help overcome the challenge of separation, but this approach is often energy intensive, in part due to the low energy density of the gaseous phase. The third approach, using a single-phase liquid, which most often acts as an intermediate heat transfer fluid between the refrigeration system and the slurry, typically requires a standard closed heat exchanger. This approach can be used to mitigate solubility issues between the working fluid and thermal storage media.

It has been found that isoparaffins, as a class, can provide the properties required for the working fluid for the direct-contact thermal energy storage system. Exemplary working fluids include the gas-to-liquid (GTL) fluids and poly-alphaolefins (PAOs) previously discussed. These materials are synthetically-derived, isoparaffinic, hydrocarbon oils well-suited as working fluids for dual high-temperature and low-temperature direct contact heat exchange with water as the thermal storage media given the solubility in water, emulsification, stability, and viscosity.

First, regarding water solubility, dissolution of water from the working fluid during cooling can lead to freezing and clogging inside the working fluid cooling unit (e.g., the evaporator in a refrigeration loop). Toluene has been used for ice slurry production and has an approximate solubility of 200 ppm at 0° C. Benzene also has a similar solubility around 300 ppm and has been used in high-temperature direct-contact spray column studies. In order to use materials like toluene and benzene, surface coatings are applied to heat exchange surfaces to mitigate ice growth. Silicone oils exhibit a water solubility of 100-200 ppm depending on the grade of oil.

PAO and GTL isoparaffins may be mixed with water and still pass through and cool in an uncoated heat exchanger, and not cause ice clogging within the heat exchanger, unlike the materials with higher water solubility discussed above. The water solubility of PAOs in low-temperature conditions is approximately <50 ppm and for GTL isoparaffins is approximately <40 ppm. The low water solubility of these fluids may allow for cooling inside a standard closed heat exchanger without leading to ice clogging.

The viscosity of the working fluid is also important. Pumping power is an important variable related to viscosity. Poor heat transfer performance due to high viscosity could lead to a significant economic and spatial penalty required by increasing the size of the storage vessel. Incomplete heat transfer could also significantly increase the pump power requirements.

The working fluid 105 should not emulsify or finely disperse in the thermal storage media 103 (e.g., water). Emulsification or fine-dispersion of the working fluid in the storage media will limit the ability to separate the working fluid from the storage media and will mitigate the ability of the skimmer 107 to separate these materials for cycling through the charging/discharging section 113. For example, crude oil derived fluids often contain impurities that can reduce the surface energy of the droplets when placed in contact with water, allowing for easier small drop formation, and higher likelihood of emulsification, endangering the stability of the system. For example, conventional Group II and III lubricants have shown that these materials can easily emulsify. It is known that various crude-oil derived lubricants will not remain chemically stable in the presence of water at high temperatures. Working fluids comprising isoparaffins mitigate these issues. The GTL fluids are synthetic isoparaffins derived from Fischer-Tropsch synthesis and remain stable when observed in direct-contact heat exchange with water. PAO lubricants (also called Group IV lubricants) are synthetically derived from ethylene and are relatively pure due to their synthetic production method, and also show strong stability in water under direct-contact conditions. Other synthetic lubricants (called Group V in the industry), including fluorocarbons and silicones, can also have good chemical and physical stability, but their cost is often prohibitively expensive for thermal energy storage applications and several classes of these fluids tend to have a high degree of water solubility.

To avoid difficulties in separating the working fluid 105 from the thermal storage media 104 at the skimmer 107, the particle size distribution of the plurality of working fluid droplets 106 may be between 2 mm and 20 mm (average diameter). Generally, small drop generation around ~1 mm diameter may increase the tendency of the fluids to emulsify, and this operating region should be avoided. The plurality of working fluid droplets 106 may have an average diameter of between 2 mm and 20 mm, or an average diameter between 2 mm and 12 mm, or an average diameter between 3 mm and 10 mm, or an average diameter between 4 mm and 8 mm.

The plurality of working fluid droplets 106 may have a non-Gaussian or asymmetric distribution, in which case the average particle size may not be a good representation of the particle size distribution. As such, the particle size distribution of the plurality of working fluid droplets 106 may be such that the proportion of small particles is limited. For example, the particle size distribution of the plurality working fluid droplets 106 may be less than about 5% of droplets with a diameter less than 2 mm, or may be less than 3% of droplets with a diameter less than 2 mm, or may be less than 2% of droplets with a diameter less than 2 mm.

Impurities in the system can play a large role in the observed heat transfer performance, and a significant level of impurities will be present in real thermal energy storage systems. Impurities lower the surface energy and decrease mixing both within and outside the drop, generally lowering the performance, especially at small drop diameters. Drops with no or minimal internal circulation of thermal energy or material are called "rigid drops". For the PAO and GTL-derived hydrocarbon systems in the presence of impurities drops with up to ~6 mm in diameter may behave as rigid drops, lowering their thermal transfer rate when compared to drops that are not "rigid".

Because of the unique and beneficial set of properties for thermal energy storage systems having working fluids that include isoparaffins such as PAOs and GTL fluids, efficient heat transfer and thermal storage in the thermal storage media can be achieved. For example, using a storage tank 103 in which the thermal storage media 104 is filled to a height of ~2 m, a similar height to many commercially available ice thermal storage systems, heat transfer results for ice slurry production have been better than predicted, with relatively short times to 95% thermal transfer when compared to the droplet travel time over the ~2 m distance. For example, travel time for the plurality of working fluid droplets 106 in the embodiment where the working fluid 105 including an isoparaffin and the storage media is water can be about 10 s for large drops (e.g. drops>5 mm in diameter which constitute the majority of the flow), and essentially full heat transfer is observed after that period of contact between the working fluid and thermal storage media.

Thermal energy storage systems having working fluids including isoparaffins uniquely provide for, (1) no observed ice clogging within a standard closed heat exchanger and (2) significantly better than expected direct-contact heat transfer performance with water.

From a design point of view, heat transfer concerns at high temperatures are much less concerning because the viscosity of the PAOs and GTL-derived hydrocarbons are significantly reduced at these conditions, about a tenfold reduction from −5° C. to 40° C. At elevated temperatures, the concern shifts to maintaining the stability of the liquid-liquid system (e.g., no chemical reactions, minimal changes to emulsification), managing the fluid's volatility, and considering the fluid's flash point and other risk factors at higher temperatures.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A thermal energy storage system, the system comprising:
a thermal storage tank configured to hold a thermal storage media and a working fluid;
an inlet in fluid communication with a liquid distributor disposed at a bottom of the thermal storage tank configured to introduce the working fluid into the thermal storage tank;
a skimmer configured to direct the working fluid accumulated at a top of the thermal storage tank toward an outlet; and
a charging/discharging section fluidly connected to the thermal storage tank via the inlet and the outlet;
wherein the working fluid has a density less than that of the thermal storage media across a range of temperatures from 0° C. to 40° C. at 1 atm, the working fluid and the thermal storage media are immiscible across the range of temperatures from 0° C. to 40° C. at 1 atm, the working fluid is in a liquid phase across the range of temperatures from 0° C. to 40° C. at 1 atm, and the working fluid has a flash point greater than 75° C. at 1 atm.

2. The thermal energy storage system of claim 1, wherein the working fluid has a vapor pressure less than 1 kPa at 40° C. and 1 atm.

3. The thermal energy storage system of claim 1, wherein the working fluid has a viscosity between 1 cSt and 150 cSt at 0° C. and 1 atm.

4. The thermal energy storage system of claim 1, wherein a volume of the working fluid is equal to or greater than 4% of a volume of the thermal storage media.

5. A thermal energy storage system, the system comprising:
a thermal storage tank configured to hold a thermal storage media and a working fluid;
an inlet in fluid communication with a liquid distributor disposed at a bottom of the thermal storage tank configured to introduce the working fluid into the thermal storage tank;
a skimmer configured to direct the working fluid accumulated at a top of the thermal storage tank toward an outlet; and
a charging/discharging section fluidly connected to the thermal storage tank via the inlet and the outlet;
wherein the thermal storage media comprises water, and the working fluid comprises an isoparaffin selected from the group consisting of polyalphaolefins, gas-to-liquid fluids, or combinations thereof.

6. The thermal energy storage system of claim 5, wherein the working fluid comprises at least 50% isoparaffin.

7. The thermal energy storage system of claim 5, wherein the working fluid comprises at least 75% isoparaffin.

8. The thermal energy storage system of claim 5, wherein the thermal storage media is an aqueous fluid and the working fluid has a water solubility of less than 120 ppm measured at a temperature of 25° C. and at a pressure of 1 atm.

9. The thermal energy storage system of claim 5, wherein the isoparaffin has a number-average molecular weight from about 100 Daltons to about 550 Daltons.

10. The thermal energy storage system of claim 5, wherein the working fluid comprises less than 1% of aromatic hydrocarbons.

11. The thermal energy storage system of claim 5, wherein the working fluid comprises less than 1% of olefinic hydrocarbons.

12. The system of claim 5, wherein the thermal storage media further comprises a freezing point depressant.

13. The system of claim 5, wherein the thermal storage media further comprises one or more suspended solids, an inert media, or both.

14. A thermal energy storage system, the system comprising:
a thermal storage tank configured to hold a thermal storage media and a working fluid;
an inlet in fluid communication with a liquid distributor disposed at a bottom of the thermal storage tank configured to introduce the working fluid into the thermal storage tank, wherein the liquid distributor comprises a plurality of nozzles with an average spatial density equal to or greater than 0.15 nozzles per 1000 cm$^2$;
a skimmer configured to direct the working fluid accumulated at a top of the thermal storage tank toward an outlet; and
a charging/discharging section fluidly connected to the thermal storage tank via the inlet and the outlet;
wherein the working fluid and the thermal storage media are immiscible across a range of temperatures from 0° C. to 40° C. at 1 atm and a flash point greater than 75° C. at 1 atm, and
wherein a volume of the working fluid is equal to or greater than 4% of a volume of the thermal storage media.

15. The system of claim 14, wherein the thermal storage tank further comprises a solid structure, and wherein a surface area of the solid structure is greater than 2% of a total internal surface area of the thermal storage tank.

16. The system of claim 15, wherein the solid structure is disposed vertically within the thermal storage tank.

17. The system of claim 16, wherein the solid structure is disposed proximate the bottom of the thermal storage tank.

18. The system of claim 14, wherein the liquid distributor comprises a fluoropolymer.

19. The system of claim 14, wherein the thermal storage tank further comprises:
a thermal storage media inlet separate from the inlet; and
a thermal storage media outlet separate from the outlet;
wherein the thermal storage media inlet and the thermal storage media outlet are in fluid communication with the charging/discharging section.

* * * * *